June 26, 1928.  1,675,288

F. C. WALTER

AUTOMOBILE BUMPER

Filed Dec. 21, 1927

Inventor

Fred C. Walter

By

Attorneys

Patented June 26, 1928.

1,675,288

UNITED STATES PATENT OFFICE.

FRED C. WALTER, OF CINCINNATI, OHIO, ASSIGNOR TO THE CINCINNATI BALL CRANK COMPANY, OF CINCINNATI, OHIO, A CORPORATION OF OHIO.

AUTOMOBILE BUMPER.

Application filed December 21, 1927. Serial No. 241,488.

This invention relates to an automobile bumper of the type which comprises a rigid or tubular impact bar secured to the automobile frame by means of yieldable or spring members.

An object of the invention is to provide a bumper of the class disclosed wherein a spring member is adapted to provide a requisite degree of yielding resistance to differently directed impacts.

Another object of the invention is to provide an automobile bumper of the class disclosed wherein the impact bar is associated with the automobile frame via spring members shaped to translate horizontally directed impacts to the vehicle springs.

Further objects and advantages will be more fully set forth in the description of the accompanying drawings, forming a part of this specification, in which.

Figure 1:
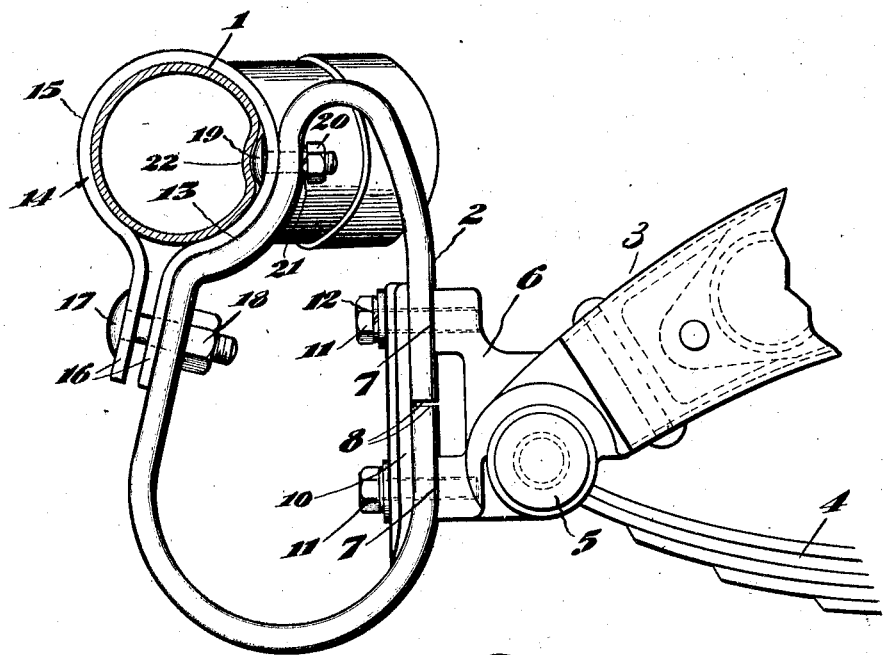
Figure 1 is a side elevation of the improved bumper spring or supporting member showing it secured to the forward end of an automobile chassis and showing the impact bar in section and in position on the spring.
Figure 2:
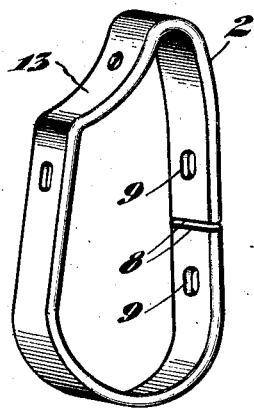
Figure 2 is a perspective view of the improved spring or supporting member.
Figure 3:
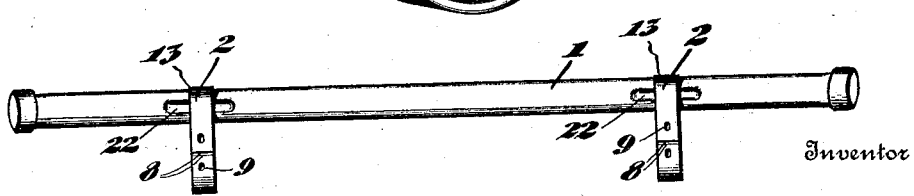
Figure 3 is a view of the bumper impact bar assembled on a pair of the improved springs or supporting members as a unit adapted to be secured to the forward end of the automobile chassis.

A tubular impact bar 1 is secured to the automobile frame by means of two spring members 2 adapted to be attached to the automobile frame at opposite sides thereof. The construction at one side of the automobile frame only is illustrated, the connection being similarly made at the other side. This frame member 3 has secured adjacent to its forward end the vehicle spring 4 by means of a shackle bolt 5.

Projecting from the end of the frame and secured thereto is the bumper mounting 6. This bumper mounting has two vertically disposed surfaces 7 spaced apart one above the other. The bumper spring 2 is of novel form and comprises a spring loop, the ends 8 of which face one another but preferably do not contact. Adjacent to these ends are apertures 9 by means of which the loop spring is attached to the bumper support. The ends of the loop are disposed against the vertical surfaces of the bumper support and an apertured reinforcing plate 10 placed on the outside of the spring ends within the loop of the spring.

Two screws 11 pass through the plate, the apertures of the bumper spring, and into the bumper support, one screw entering each of the vertically disposed bumper support surfaces. These reinforcing plates 10 tend to prevent breakage of the bumper springs adjacent to the bolt holes. Lock washers 12 are placed between the heads of these screws and the retaining plate.

The bumper spring so mounted is provided with a lower loop of substantially U-shape and an upper loop of lesser diameter. A seat 13 for the impact bar is provided in the forward portion of the upper loop, the loop being there contoured into a forwardly facing concavity.

Passing about the impact bar at the points where connections to the bumper springs are made are clips 14, each clip comprising an eyelet portion 15 and two extending ends 16. These clips are so positioned that the eyelet portions seat in the concave seats in the bumper springs and the ends extend downwardly parallel with that portion of the loop springs below the seat and above the U-shaped lower loop. These ends of each clip are apertured in registry with an aperture in the bumper spring and each clip is secured to the bumper spring by means of a bolt 17 and nut 18, the bolt passing through the ends of the clip and through the spring.

The tightening of this nut 18, therefore, tightens the clip about the tubular impact bar and secures the impact bar to the bumper spring. A second attachment is made near the top of the concave seat by means of a bolt 19, a nut 20, and washer 21, the bolt passing through the eyelet of the clip and through the bumper spring at that point. The tubular bumper bar is provided with a longitudinal depression 22 at that point and the head of the bolt fits within this depression, thereby additionally securing the impact bar against rotation or displacement and also enabling one size bar to be used on various cars which have different frame widths.

The impact bar is thus mounted at a point higher than its support, so that any horizontal shock will be transmitted by the yield of the bumper springs downwardly onto the vehicle springs. The upper loop being smaller than the lower loop is less resilient and the two together provide a compound resistance to impacts. Many impacts might not be in a horizontal direction, and it to be noted that even should the impact have an upward component this upward component would be inclined to be translated downwardly by the flexing of the upper loop which extends vertically from the vertically disposed supporting surface.

In fact, this loop spring provides yieldable resistance to impacts upon the impact bar from whatever direction they may come and the impact bar can consequently be subjected to no stresses for which there is not present a yieldable resistance.

This loop spring could be made in several pieces without departing from the spirit of this invention but a bumper spring comprising a flat strip of spring metal bent into a loop is disclosed since it is the preferred embodiment of the invention because of economic factors.

Having described my invention, I desire to be limited only by the ensuing claims:

1. An automobile bumper, comprising, a rigid impact bar, and a plurality of vertically disposed loop springs connecting the impact bar to the automobile frame, said impact bar mounted at points upon the loop springs above the points of connection of the loop springs to the automobile.

2. A bumper for automobiles, comprising, a tubular impact bar, and two loop springs connected thereto, said loop springs adapted to be connected to an automobile frame, said loop springs each comprising a lower U-shaped loop and an upper loop of lesser diameter.

3. A spring adapted to connect an impact bar with an automobile frame, said spring comprising, a length of flat spring metal bent into a substantial loop with the ends opposing each other, said loop provided exteriorly with a concave surface adapted to form a seat for a tubular impact bar.

4. A bumper for automobiles, comprising, a rigid impact bar, supports secured in spaced relation on the automobile frame, a clip for each support, said clips surrounding said bar, bolts attaching said clips to said supports, and said bar having longitudinally disposed depressions engageable with the head of a bolt in each clip for preventing rotation of the bar and permitting longitudinal adjustment of the bar in relation to the supports.

In witness whereof, I hereunto subscribe my name.

FRED C. WALTER.